United States Patent
He et al.

(10) Patent No.: US 11,693,401 B2
(45) Date of Patent: *Jul. 4, 2023

(54) METHOD, DEVICE, AND SYSTEM FOR REDUNDANCY CONTROL

(71) Applicant: SZ DJI TECHNOLOGY CO., LTD., Shenzhen (CN)

(72) Inventors: Gang He, Shenzhen (CN); Chang Geng, Shenzhen (CN); Chaobin Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,601

(22) Filed: Sep. 13, 2021

(65) Prior Publication Data

US 2021/0405634 A1    Dec. 30, 2021

Related U.S. Application Data

(63) Continuation of application No. 16/268,889, filed on Feb. 6, 2019, now Pat. No. 11,119,474, which is a
(Continued)

(51) Int. Cl.
*G05D 1/00* (2006.01)
*B64C 39/02* (2023.01)
(Continued)

(52) U.S. Cl.
CPC ......... *G05D 1/0022* (2013.01); *B64C 39/024* (2013.01); *G05D 1/0077* (2013.01);
(Continued)

(58) Field of Classification Search
CPC ...... G05D 1/0022; G05D 1/0077; G05D 1/10; B64C 39/024; B64C 2201/146; H04B 7/18506; G08C 17/02; G05B 9/03
See application file for complete search history.

(56) References Cited

U.S. PATENT DOCUMENTS 8,983,682 B1    3/2015   Peeters et al.
9,477,226 B2   10/2016   Olson et al.
(Continued)

FOREIGN PATENT DOCUMENTS

CN    105334863 A    2/2016
CN    205049929 U    2/2016
(Continued)

OTHER PUBLICATIONS

The World Intellectual Property Organization (WIPO) International Search Report for PCT/CN2016/094879 dated Apr. 27, 2017 5 pages.

*Primary Examiner* — Mussa A Shaawat

(74) *Attorney, Agent, or Firm* — Anova Law Group, PLLC

(57) ABSTRACT

A method includes establishing a first wireless connection between a movable object and a first remote control device, and establishing a second wireless connection between the movable object and at least one second remote control device. The method also includes selecting, based on a determination that the first wireless connection is normal, a first control signal received from the first remote control device to control the movable object. The method further includes selecting, based on a determination that the first wireless connection is abnormal and that the second wireless connection is normal, a second control signal received from the at least one second remote control device to control the movable object.

20 Claims, 9 Drawing Sheets

Related U.S. Application Data continuation of application No. PCT/CN2016/094879, filed on Aug. 12, 2016.

(51) Int. Cl.
- *G05D 1/10* (2006.01)
- *G08C 17/02* (2006.01)
- *H04B 7/185* (2006.01)
- *H04B 7/26* (2006.01)

(52) U.S. Cl.
CPC ............... *G05D 1/10* (2013.01); *G08C 17/02* (2013.01); *H04B 7/18506* (2013.01); *H04B 7/26* (2013.01); *B64U 2201/20* (2023.01)

(56) References Cited

U.S. PATENT DOCUMENTS

| | | | |
|---|---|---|---|
| 9,797,978 B1 | 10/2017 | Melamed et al. | |
| 9,828,107 B1* | 11/2017 | Ruymgaart | G05D 1/0077 |
| 10,057,793 B2* | 8/2018 | Mueller | H04W 24/04 |
| 10,168,695 B2 | 1/2019 | Barnickel et al. | |
| 10,263,695 B2 | 4/2019 | Wang et al. | |
| 10,505,622 B1 | 12/2019 | Stein et al. | |
| 10,583,921 B1 | 3/2020 | McCullough et al. | |
| 10,644,752 B2 | 5/2020 | Henry et al. | |
| 10,979,509 B2 | 4/2021 | Ma et al. | |
| 2014/0172203 A1* | 6/2014 | White | B64C 13/02 701/4 |
| 2015/0192925 A1* | 7/2015 | Moles | H04B 1/38 701/2 |
| 2015/0197335 A1* | 7/2015 | Dekel | B64C 29/0033 701/5 |
| 2015/0225081 A1 | 8/2015 | Stabler et al. | |
| 2016/0018793 A1* | 1/2016 | Becker | G05B 9/03 701/3 |
| 2016/0052626 A1 | 2/2016 | Vander | |
| 2016/0253908 A1 | 9/2016 | Chambers et al. | |
| 2016/0318615 A1 | 11/2016 | Pick | |
| 2017/0021925 A1* | 1/2017 | Weller | G06Q 10/06 |
| 2017/0045892 A1* | 2/2017 | Wang | G01S 19/39 |
| 2017/0084181 A1 | 3/2017 | Wilson et al. | |
| 2017/0277153 A1* | 9/2017 | Samii | G05B 19/0425 |
| 2017/0349267 A1 | 12/2017 | Venkataraman et al. | |
| 2017/0358215 A1* | 12/2017 | Priest | H04W 84/00 |
| 2017/0358223 A1* | 12/2017 | Priest | G08G 5/0039 |
| 2017/0361920 A1 | 12/2017 | Reichert et al. | |
| 2017/0364071 A1 | 12/2017 | Fu et al. | |
| 2018/0350243 A1 | 12/2018 | Priest | |
| 2019/0140699 A1 | 5/2019 | Park et al. | |
| 2020/0051445 A1 | 2/2020 | Priest | |

FOREIGN PATENT DOCUMENTS

| | | |
|---|---|---|
| CN | 105575095 A | 5/2016 |
| CN | 105763230 A | 7/2016 |
| WO | 2016119064 A1 | 8/2016 |

\* cited by examiner

METHOD, DEVICE, AND SYSTEM FOR REDUNDANCY CONTROL

CROSS-REFERENCE TO RELATED APPLICATIONS

This application is a continuation application of U.S. application Ser. No. 16/268,889, filed on Feb. 6, 2019, which is a continuation application of International Application No. PCT/CN2016/094879, filed on Aug. 12, 2016, the entire contents of both of which are incorporated herein by reference.

TECHNICAL FIELD

The present disclosure relates to the technology field of control and, more particularly, to methods, devices, and systems for redundancy control.

BACKGROUND

Unmanned aerial vehicle ("UAV") is an unmanned aircraft operated through radio frequency remote control devices and programmable control devices provided onboard the UAV. In currently available UAV control systems, when the remote control device experiences abnormal connection, the UAV enters into an out-of-control state, posing safety issues.

SUMMARY

In accordance with the present disclosure, there is provided a method. The method includes receiving, by a first receiver communicatively coupled with a first remote control device, a first control signal from the first remote control device. The method also includes receiving, by a second receiver communicatively coupled with a second remote control device, a second control signal from the second remote control device. The method further includes selecting one of the first control signal of the first remote control device and the second control signal of the second remote control device for controlling a movable object.

In accordance with the present disclosure, there is also provided a device. The device includes a memory configured to store instructions. The device also includes a processor configured to execute the instructions to receive, through a first receiver communicatively coupled with a first remote control device, a first control signal from the first remote control device. The processor is also configured to receive, through a second receiver communicatively coupled with a second remote control device, a second control signal from the second remote control device. The processor is further configured to select one of the first control signal of the first remote control device and the second control signal of the second remote control device for controlling a movable object.

The present disclosure provides a method, device, and system for redundancy control. The method includes receiving, via a first receiver communicatively coupled with a main remote control device, a first control signal from the main remote control device. The method also includes receiving, via a second receiver communicatively coupled with a backup remote control device, a second control signal from the backup remote control device. The method also includes selecting one of the first control signal from the main remote control device and the second control signal from the backup remote control device to control the movable object. Through the redundancy control using multiple remote control devices, the disclosed methods, devices, and systems reduce flight safety related accidents caused by abnormal connections of a remote control device.

BRIEF DESCRIPTION OF THE DRAWINGS

To better describe the technical solutions of the various embodiments of the present disclosure, the accompanying drawings showing the various embodiments will be briefly described. As a person of ordinary skill in the art would appreciate, the drawings show only some embodiments of the present disclosure. Without departing from the scope of the present disclosure, those having ordinary skills in the art could derive other embodiments and drawings based on the disclosed drawings without inventive efforts.

DETAILED DESCRIPTION OF THE EMBODIMENTS

Figure 1:
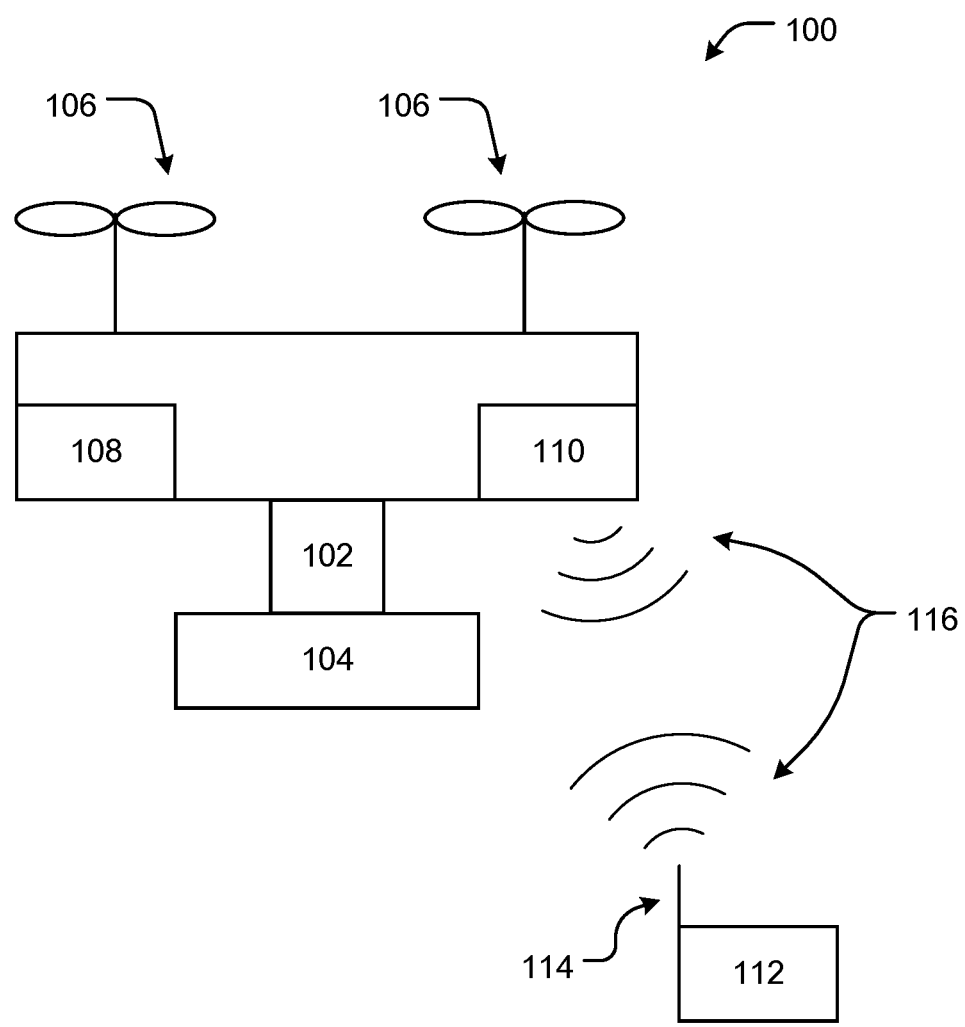
FIG. 1 is a schematic diagram of a movable object according to an example embodiment.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Example embodiments will be described with reference to the accompanying drawings, in which the same numbers refer to the same or similar elements unless otherwise specified.

As used herein, when a first component (or unit, element, member, part, piece) is referred to as "coupled," "mounted," "fixed," "secured" to or with a second component, it is intended that the first component may be directly coupled, mounted, fixed, or secured to or with the second component, or may be indirectly coupled, mounted, or fixed to or with the second component via another intermediate component. The terms "coupled," "mounted," "fixed," and "secured" do not necessarily imply that a first component is permanently coupled with a second component. The first component may be detachably coupled with the second component when these terms are used. When a first component is referred to as "connected" to or with a second component, it is intended that the first component may be directly connected to or with the second component or may be indirectly connected to or with the second component via an intermediate component. The connection may include mechanical and/or electrical connections. The connection may be permanent or detachable. The electrical connection may be wired or wireless. When a first component is referred to as "disposed," "located," or "provided" on a second component, the first component may be directly disposed, located, or provided on the second component or may be indirectly disposed, located, or provided on the second component via an intermediate component. When a first component is referred to as "disposed," "located," or "provided" in a second component, the first component may be partially or entirely disposed, located, or provided in, inside, or within the second component. The terms "perpendicular," "horizontal," "left," "right," "up," "upward," "upwardly," "down," "downward," "downwardly," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed. The term "communicatively coupled" indicates that related items are coupled or connected through a communication chancel, such as a wired or wireless communication channel.

A "normal" or a "abnormal" connection with a remote control device can be defined based on actual needs. For example, when a connection is typical, working properly, it may be defined as a normal connection. When a connection is interrupted, or completely or partially lost, or otherwise cannot work properly, it may be defined as an abnormal connection. A person having ordinary skill in the art can appreciate the scope of a normal connection or an abnormal connection in the context disclosed herein.

Further, when an embodiment illustrated in a drawing shows a single element, it is understood that the embodiment may include a plurality of such elements. Likewise, when an embodiment illustrated in a drawing shows a plurality of such elements, it is understood that the embodiment may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one embodiment but not another embodiment may nevertheless be included in the other embodiment.

The following descriptions explain example embodiments of the present disclosure, with reference to the accompanying drawings. Unless otherwise noted as having an obvious conflict, the embodiments or features included in various embodiments may be combined.

The following embodiments do not limit the sequence of execution of the steps included in the disclosed methods. The sequence of the steps may be any suitable sequence, and certain steps may be repeated.

FIG. 1 is a schematic diagram of a movable object 100 according to an example embodiment of the present disclosure. The movable object 100 may include a carrier 102 and a payload 104. Although in FIG. 1, the movable object 100 is depicted as an aircraft, the present disclosure does not limit the movable object 100 to be an aircraft. The movable object 100 may be other types of movable objects. A person having ordinary skill in the art can appreciate that the embodiments of the flight system described herein may be applicable to any movable object (e.g., unmanned aerial vehicles). In some embodiments, the payload 104 may be directly carried by the movable object 100, and the carrier 102 may be omitted. In some embodiments, as shown in FIG. 1, the movable object 100 may include one or more propulsion assemblies 106, a sensor system 108, and a communication system 110.

In some embodiments, each propulsion assembly 106 may include one or more of a rotatable body, a propeller, a blade, an engine, a motor, a wheel, a bearing, a magnet, a nozzle, etc. For example, the rotatable body of the propulsion assembly 106 may be a self-tightening rotatable body, an assembly of rotatable bodies, or another rotation-type propulsion device. The movable object 100 may include one or multiple propulsion assemblies 106. In some embodiments, all of the propulsion assemblies 106 may be of the same type. In some embodiments, the propulsion assemblies 106 may be of different types. The propulsion assembly 106 may be mounted to the movable object 100 through any suitable fastening mechanism, such as a supporting structure (e.g., a driving shaft). The propulsion assemblies 106 may be mounted at any suitable location of the movable object 100, such as a top portion, a bottom portion, a front portion, a rear portion, a side portion, or any combination thereof.

In some embodiments, the propulsion assemblies 106 may enable the movable object 100 to vertically take off from a surface, or vertically land onto a surface, without requiring the movable object 100 to move horizontally (e.g., without requiring the movable object 100 to taxi on a runway). In some embodiments, the propulsion assemblies 106 may enable the movable object 100 to hover at a predetermined location in the air or along a predetermined direction. The one or multiple propulsion assemblies 106 may be controlled independently of other propulsion systems. In some embodiments, the one or multiple propulsion assemblies 106 may be controlled simultaneously. For example, the movable object 100 may include one or more rotatable bodies that can rotate in the horizontal direction (e.g., rotate horizontally around a vertical axis of rotation), which enable the movable object to ascend and/or move forward when tracking a target. The rotatable bodies that can rotate in the horizontal direction may be actuated to provide the capabilities of vertical takeoff, vertical landing, and hovering. In some embodiments, one or multiple of the rotatable bodies that can rotate in the horizontal direction may rotate in a clockwise direction, and one or multiple of the rotatable bodies that can rotate in the horizontal direction may rotate in a counter-clockwise direction. In some embodiments, the number of rotatable bodies that rotate in the clockwise direction may be the same as the number of rotatable bodies that rotate in the counter-clockwise direction. Each of the rotatable bodies that can rotate in the horizontal direction may independently change the rotation speed such that each rotatable body may cause the movable object 100 to ascend and/or move forward, thereby causing the movable object 100 to adjust its spatial orientation, velocity, and/or acceleration (e.g., the rotation and/or translation in up to three degrees of freedom).

The sensor system 108 may include one or more sensors configured to measure, detect, or determine the spatial orientation, velocity, and/or acceleration of the movable object 100 (e.g., the rotation and/or translation in up to three degrees of freedom). The one or more sensors may include any suitable sensors, such as a global positioning system ("GPS") sensor, a motion sensor, an inertial sensor, a near field sensor, and/or an imaging sensor. In some embodiments, the sensed data provided by the sensor system 108 may be used to determine the spatial orientation, velocity, and/or acceleration of the movable object 100 (e.g., as discussed below, using a suitable processor or controller). In some embodiments, the sensor system 108 may acquire environmental data of the movable object 100, such as weather conditions, potential obstacle that is approaching the movable object 100, a location of a geographical feature, a location of a man-made structure, etc.

The communication system 110 is configured to enable the movable object 100 to communicate wirelessly with a terminal 112 of another communication system 114. The communication systems 110 and 114 may include any suitable number of transmitters, receivers, and/or transceivers. The communication may be a one-way communication, through which data may be transmitted in one direction. For example, the one-way communication may include moving object 100 transmitting data to the terminal 112, or the terminal 112 transmitting data to the moving object 100, but not both. One or multiple transmitters included in the communication system 110 may transmit data to one or multiple receivers included in the communication system 114, or one or multiple transmitters included in the communication system 114 may transmit data to one or multiple receivers included in the communication system 110. In some embodiments, the communication may be a two-way communication. Data may be communicated between the movable object 100 and the terminal 112 in two directions. The two-way communication may include one or multiple transmitters of the moving object 100 transmitting data to one or multiple receivers of the communication system 114, and one or multiple transmitters of the communication system 114 transmitting data to one or multiple receivers of the moving object 100.

In some embodiments, the terminal 112 may provide control data or signals to one or more of the movable object 100, the carrier 102, and the payload 104. The terminal 112 may receive information from one or more of the movable object 100, the carrier 102, and the payload 104 (such as information relating to the location and/or motion of the movable object 100, the carrier 102, or the payload 104, and data sensed by the payload 104, such as image data captured by a camera). In some embodiments, the control data or signal provided by the terminal 112 may include instructions or commands relating to location, motion, or actuation, or control data for controlling the movable object 100, the carrier 102, and/or the payload 114. For example, the control data or signal may cause the movable object 100 to change its location and/or orientation (e.g., through controlling the propulsion assemblies 106), or may cause the payload 104 to move relative to the movable object 100 (e.g., through controlling the carrier 102). The control data or signal provided by the terminal 112 may control the payload 104, such as control the operation of a camera or other imaging devices (e.g., capturing images or videos of static or moving objects, zooming, starting or shutting down, switching imaging modes, changing resolution of images and/or videos, changing focal lengths, changing depth of field, changing exposure time, changing angle of view or field of view, etc.). In some embodiments, the communication involving the movable object 100, the carrier 102, and/or the payload 104 may include information provided by one or more sensors (e.g., those included in sensor system 108 or payload 104). In some embodiments, the communication may include sensed information transmitted from one or more different types of sensors (e.g., GPS sensor, motion sensor, inertial sensor, near field sensor, and/or imaging sensor). The sensed information may relate to the orientation and/or location, motion, and/or acceleration of the movable object 100, the carrier 102, and/or the payload 104. Sensed information provided by the payload 104 may include data captured by the payload 104 and/or information relating to the status of the payload 104. The control data or signal provided by the terminal 112 may be used to track the status of one or more of the movable object 100, the carrier 102, and/or the payload 104. In some embodiments, each of the carrier 104 and payload 104 may include a communication device configured to communicate with the terminal 112, such that the terminal 112 can individually communicate or track the movable object 100, the carrier 102, and/or the payload 104.

In some embodiments, in addition to communicating with the terminal 112, the movable object 100 may communicate with other remote devices. Likewise, in addition to communicating with the movable object 100, the terminal 112 may also communicate with other remote devices. For example, the movable object 100 and/or the terminal 112 may communicate with another movable object or another carrier and/or payload of another movable object. In some embodiments, the other remote devices may include a second terminal or other computing devices (e.g., workstations, desktop computers, tablets, smart phones, or other mobile devices). The remote devices may transmit data to the movable object 100, receive data from the movable object 100, transmit data to the terminal 112, and/or receive data from the terminal 112. In some embodiments, the remote devices may be connected to the Internet or other telecommunication networks, such that the remote devices may upload the data received from the movable object 100 and/or the terminal 112 to a website or a server.

In some embodiments, the terminal 112 may control the motion of the movable object 100, the motion of the carrier 102, the motion of the payload 104 relative a fixed reference object (e.g., an external environment), and/or the relative motion between the movable object 100, the carrier 102, and the payload 104. The terminal 112 may be a remote control terminal located at a place away from the movable object 100, the carrier 102, and/or the payload 104. In some embodiments, the terminal 112 may be located or mounted on a support platform. In some embodiments, the terminal 112 may be handheld or wearable. For example, the terminal 112 may include smart phones, tablets, desktop computers, workstations, eye glasses, gloves, helmets, microphones, and/or any combination thereof. In some embodiments, the terminal may include a user interface, such as a keyboard, a mouse, a joystick, a touch screen, and/or a display screen. A user may interact with the terminal to provide suitable user input, such as a manual input command, a voice control, a hand gesture control, or a location control (e.g., through the motion, location, and/or tilting of the terminal).

System for Redundancy Control

Figure 2:
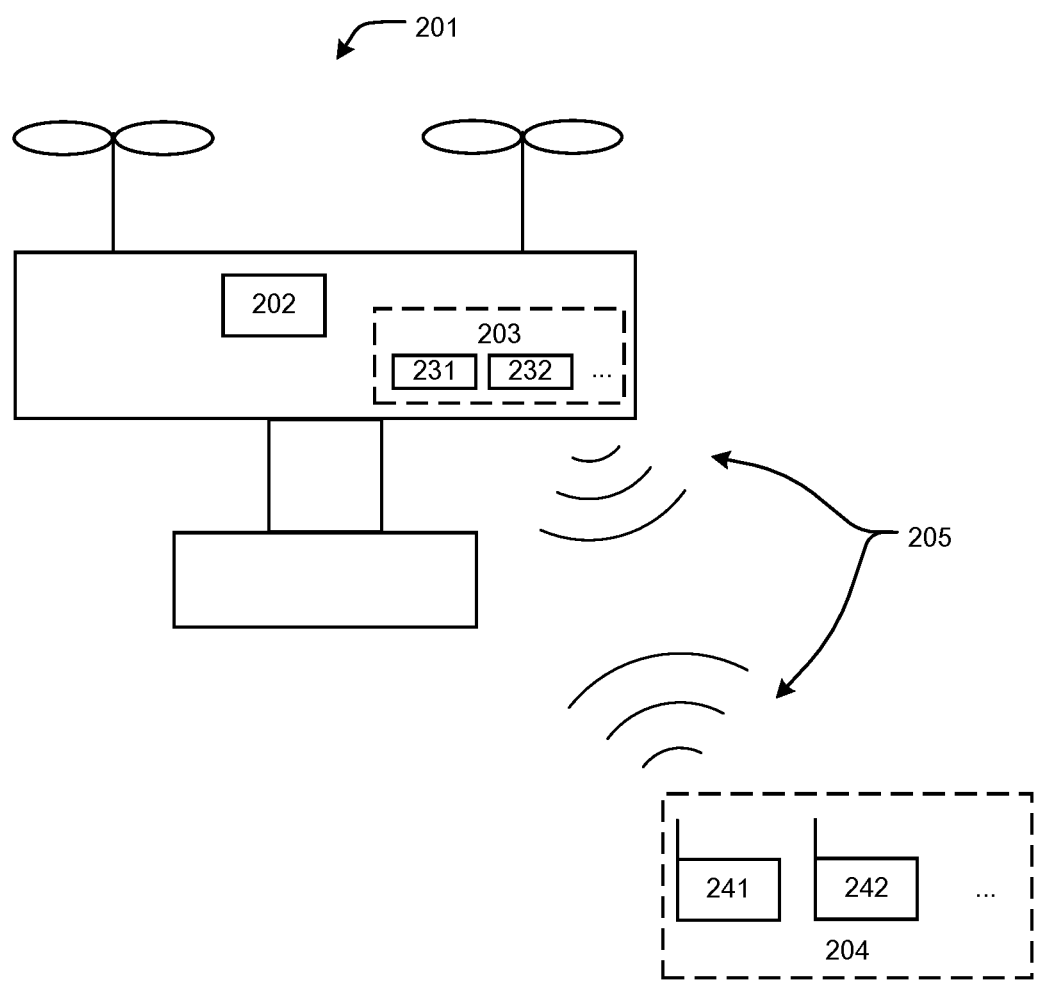
FIG. 2 is a schematic diagram of a system for redundancy control according to an example embodiment.

FIG. 2 is schematic diagram of a system for redundancy control according to an example embodiment of the present disclosure. The system for redundancy control may include a movable object 201 and a terminal 204 (also referred to as a remote control device group 204). In the following descriptions, an unmanned aerial vehicle ("UAV") is used as an example of the movable object 201, a remote control device is used as an example of the terminal 204. A person having ordinary skill in the art can appreciate that these are examples only, and do not limit the scope of the present disclosure. The movable object 201 may include a flight controller 202 and one or more receivers, such as a first receiver 231, a second receiver 232, and other receivers. The terminal 204 may include one or more remote control devices, such as a first remote control device 241, a second remote control device 242, and other remote control devices.

In some embodiments, the first remote control device 241 may transmit a first control signal to the first receiver 231 through a wireless communication link. The first receiver 231 may transmit the first control signal to the flight controller 202, thereby forming a control signal input source. In some embodiments, the second remote control device 242 may transmit a second control signal to the second receiver 232. The second receiver 232 may transmit the second control signal to the flight controller 202, thereby forming another control signal input source. Other remote control devices may communicate with other receivers through wireless communication links to form other control signal input sources. The receivers 231 and 232 and the flight controller 202 may be communicatively coupled with one another through a signal or data bus, such as a controller arear network ("CAN") bus.

The multiple receivers and remote control devices form multiple groups or pairs of receivers and remote control devices. The flight controller 202 may be communicatively coupled with the multiple groups of receivers and remote control devices. The multiple groups of receivers and remote control devices serve as control signal input sources for providing control signals to the flight controller 202. The flight controller 202 may select one of the control signal input sources to obtain a control signal or automatically switch between different control signal input sources based on the flight condition and/or the flight strategy, thereby reducing the likelihood of having a flight safety related accident.

In some embodiments, the remote control device group 204 may include multiple remote control devices, such as the first remote control device 241, the second remote control device 242, and other remote control devices.

In some embodiments, the remote control devices included in the remote control device group 204 may adopt a pressure-velocity control method. Each of the remote control device may include a joystick and a pressure sensor. The joystick may receive a pressure exerted by a user. The pressure sensor may convert the pressure experienced by the joystick to an electrical signal. The magnitude of the pressure may be reflected in a control signal transmitted by a gimbal attitude control device included in the remote control device. The control signal indicates a magnitude of operation on a gimbal carried by the UAV 201. The higher the pressure, the greater the magnitude of operation on the gimbal.

In some embodiments, one or more of the remote control devices included in the remote control device group 204 may adopt an angle-velocity control method. A rotatable knob may be provided on each of the remote control device. A user may rotate the knob. The magnitude of the angle of rotation may be reflected in a control signal transmitted by a focus-following device included in the remote control device. The control signal indicates a magnitude of operation. The greater the angle of rotation on the knob, the greater the magnitude of operation.

In some embodiments, one or more of the remote control devices included in the remote control device group 204 may include a potentiometer finger wheel (hence the remote control device may be referred to as a potentiometer finger wheel remote control device). The potentiometer finger wheel remote control device includes a potentiometer finger wheel. An amount of displacement of the potentiometer finger wheel from a central position may be reflected in a control signal transmitted by a potentiometer finger wheel remote control device. The control signal indicates a magnitude of operation. The greater the displacement, the greater the magnitude of operation.

The above remote control devices are examples only, and the present disclosure does not limit the type of remote control devices. Other remote control devices may also be used. In some embodiments, the remote control device group 204 of remote control devices may adopt a combination of different control methods, rather than having a same control method for all of the remote control devices.

In some embodiments, the remote control devices included in the remote control device group 204 may have different priorities. For example, the first remote control device 241 may be a main remote control device, and the second remote control device 242 and other remote control devices may be backup remote control devices. Based on a determination that a connection between a receiver included in the flight controller 202 and the main remote control device 241 is normal (normal means that the connection enables typical, normal, or expected operations or controls of the UAV 201), the flight controller 202 may control the flight of the UAV 201 based on control signals received from the main remote control device 241. In some embodiment, the priority of the second remote control device 242 may be higher than other backup remote control devices. Based on a determination that a connection with the main remote control device 241 is abnormal, the flight controller 202 may switch the control of the UAV 201 from the main remote control device 241 to the backup remote control device 242.

Figure 3:
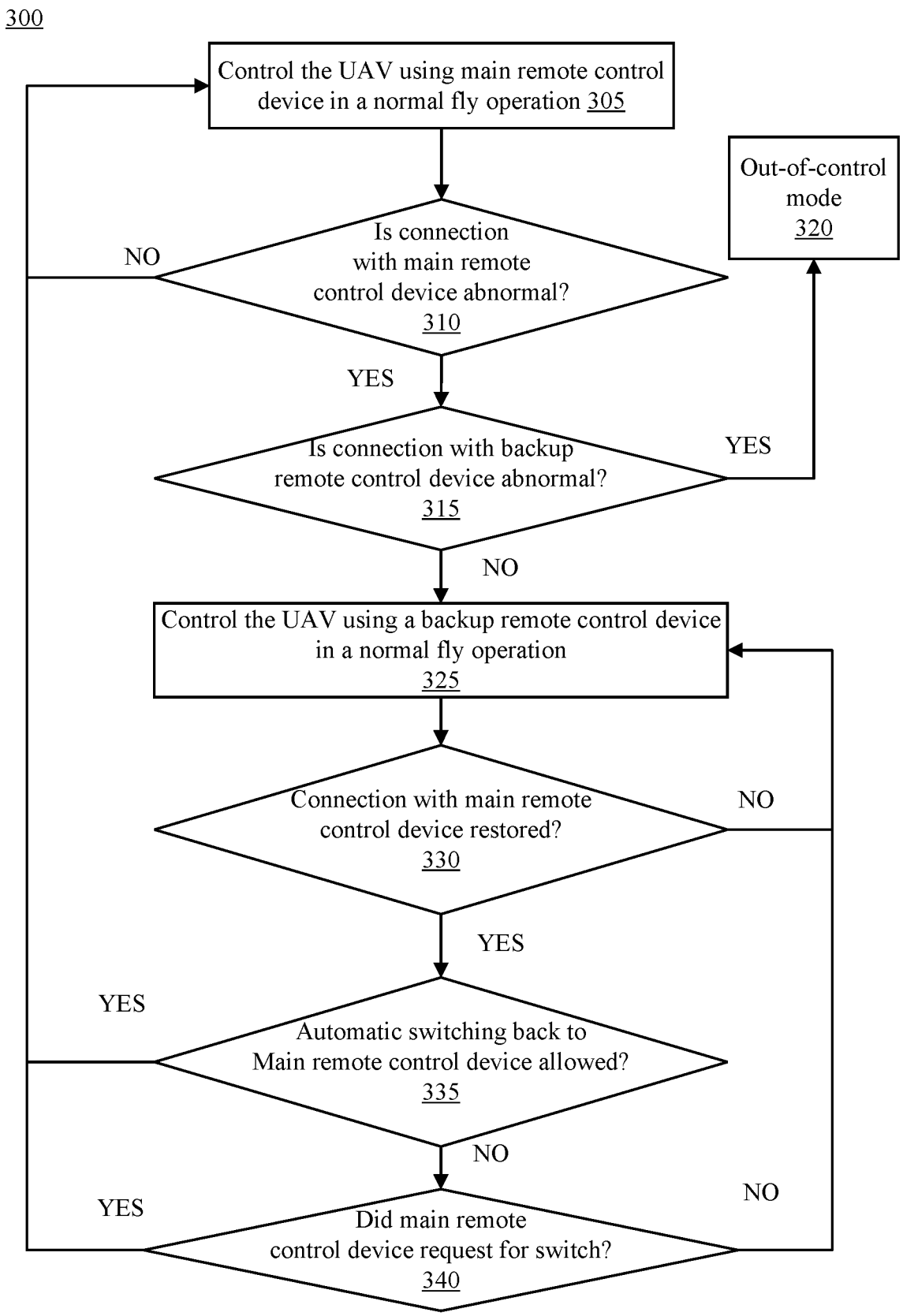
FIG. 3 is a flow chart illustrating a method for redundancy control according to an example embodiment.

FIG. 3 is a flow chart illustrating a method 300 for redundancy control, according to an example embodiment of the present disclosure. The method 300 may be performed by any processor or controller disclosed herein, such as a redundancy control device. As shown in FIG. 3, the method 300 includes controlling the UAV 201 using a main remote control device in a normal fly operation (step 305). In some embodiments, the redundancy control device may receive, via the first receiver 231, a first control signal from the main remote control device 241. The flight controller 202 may also receive, via the second receiver 232, a second control signal from the backup remote control device 242. Based on a determination that the connection with the main remote control device 241 is normal, the redundancy control device may control the flight of the UAV 201 based on the first control signal received from the main control device 241.

In some embodiments, the redundancy control device may be included in the flight controller 202, or may be included in other devices independent of the flight controller 202. For convenience of discussion, the descriptions may use the flight controller 202 as an example of the redundancy control device for executing the disclosed methods.

In some embodiments, a remote control device may be wirelessly connected with a corresponding receiver. The wireless connection between the main remote control device 241 and the corresponding first receiver 231 and the wireless connection between the backup remote control device 242 and the corresponding receiver 232 may use different frequencies. As such, after the remote control device and the receiver match the frequency, different pairs of remote control devices and receivers do not interfere with their corresponding wireless communication.

In some embodiments, the receiver and the remote control device may by physically connected. The physical connection may include the CAN bus.

The flight controller 202 may determine whether the connection with the main remote control device 241 is abnormal (step 310). Based on a determination that the connection with the main remote control device 241 is not abnormal (No, step 310), the flight controller 202 may continue to control the UAV 201 based on the first control signal received from the main remote control device 241. Based on a determination that the connection with the main remote control device 241 is abnormal (Yes, step 310), the flight controller 202 may determine whether a connection with the backup remote control device 242 is abnormal (step 315).

In some embodiments, an abnormal connection with a remote control device may be caused by a loss of wireless connection between a receiver and a corresponding remote control device. The flight controller 202 may receive connection information from the receiver indicating that the connection with the remote control device is abnormal. In some embodiments, an abnormal connection with a remote control device may be caused by malfunction of a remote control device. The flight controller 202 may receive connection information from the receiver indicating that the connection with the corresponding remote control device is abnormal. In some embodiments, the abnormal connection with a remote control device may be caused by a loss of a physical connection between the receiver and the flight controller 202, such that the flight controller 202 cannot receive the connection information from the receiver, thereby determining that a connection with the remote control device corresponding to the receiver is abnormal.

In some embodiments, the backup remote control device may include one or more backup remote control devices.

In some embodiments, there is only one backup remote control device. When a connection with the main remote control device is abnormal, the flight controller 202 may determine whether the connection with the only one backup remote control device is normal. Based on a determination that the connection with the only one remote control device is normal (No, step 315), the flight controller 202 may control the flight of the UAV 201 based on control signals received from the only one backup remote control device in a normal fly operation (step 325). Based on a determination that the connection with the only one backup remote control device is abnormal (Yes, step 315), the flight controller 202 may activate an out-of-control mode (step 320). The out-of-control mode may include at least one of an out-of-control return, suspension, or descending at a predetermined speed.

In some embodiments, there are multiple backup remote control devices. When the connection with the main remote control device is abnormal (Yes, step 310), the flight controller 202 may determine whether the connections with the backup remote control devices are abnormal based on a predetermined rule (step 315). When there is a backup remote control device with which the connection is normal (e.g., not lost) (No, step 315), the flight controller 202 may switch the control of the UAV 201 from the main remote control device to the backup remote control device. The flight controller 202 may control the flight of the UAV 201 based on control signals received from the backup remote control device (step 325), and terminate the determination of whether the connections with the backup remote control devices are normal. In some embodiments, the predetermined rule may include at least one of: checking connections of the backup remote control devices based on their priorities (e.g., from high to low), checking connections of the backup remote control devices based on their identification numbers, or checking connections of the backup remote control devices randomly. Based on a determination that connections with all of the multiple backup remote control devices are abnormal (Yes, step 315), the flight controller 202 may activate the out-of-control mode (step 320).

In some embodiments, there may be multiple backup remote control devices. When the connection with the main remote control device is abnormal, and when there is a backup remote control device with which the connection is normal, the flight controller 202 may select, based on a predetermined rule, a control signal transmitted by a backup remote control device with which the connection is normal to control the UAV. In some embodiments, the predetermined rule may include at least one of: selection based on an order from a high priority to a low priority, selection based on an identification number of the remote control device, or random selection. When connections with all of the backup remote control devices are abnormal, the UAV may enter the out-of-control mode.

In some embodiments, the flight controller 202 may determine whether the connection with the main remote control device is restored (step 330). Based on a determination that the connection with the main remote control device is restored (Yes, step 330), the flight controller 202 may determine whether automatically switching back to the main remote control device is allowed (step 335). Based on a determination that automatically switching back to the main remote control device is allowed (Yes, step 335), the flight controller 202 may switch the control of the UAV 201 back to the main remote control device and control the UAV 201 based on control signals received from the main remote control device (step 305). When the flight controller 202 determines that automatically switching back to the main remote control device is not allowed (No, step 335), the flight controller 202 may continue to control the UAV 201 based on control signals received from the backup remote control device (e.g., by maintaining the control of the UAV 201 by the backup remote control device currently controlling the UAV 201). The flight controller 202 may determine whether the main remote control device requested to switch the control of the UAV 201 to the main remote control device (step 340). When the flight controller 202 determines that a request for switching the control has been received from the main remote control device (Yes, step 340), the flight controller 202 may switch the control of the UAV 201 to the main remote control device, and control the flight of the UAV 201 based on the control signals received from the main remote control device (step 305). When the flight controller 202 determines that a request for switching the control has not been received from the main remote control device (No, step 340), the flight controller 202 may continue to control the UAV 201 based on control signals received from the backup remote control currently controlling the UAV 201 (step 325).

Figure 4:
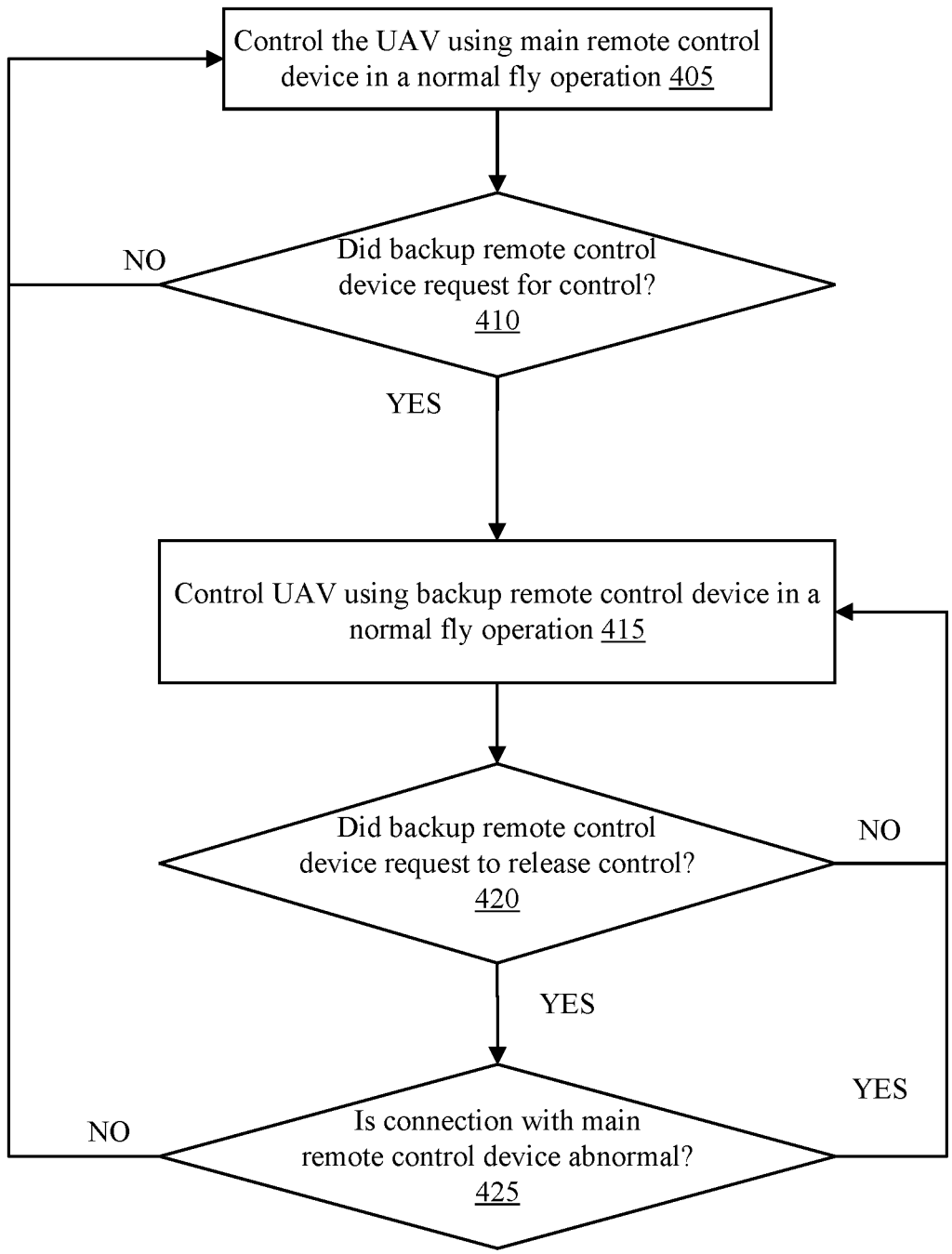
FIG. 4 is a flow chart illustrating a method for redundancy control according to another example embodiment.

FIG. 4 is a flow chart illustrating a method 400 for redundancy control, according to another example embodiment of the present disclosure. The method 400 may be performed by any processor or controller disclosed herein, such as a redundancy control device.

In some embodiments, method 400 may include controlling the UAV 201 using a main remote control device in a normal fly operation (step 405). For example, the redundancy control device may receive, via the first receiver 231, a first control signal from the main remote control device 241. The redundancy control device may also receive, via the second receiver 232, a second control signal from the backup remote control device 242. In some embodiments, the main remote control device 241 may be referred to as a trainee remote control device, and the backup remote control device may be referred to as a trainer remote control device.

In some embodiments, the redundancy control device may be included in the flight controller 202, or may be included in other devices independent of the flight controller 202. For convenience of discussion, the descriptions may use the flight controller 202 as an example of the redundancy control device for executing the disclosed methods.

Based on a determination that the connection with the main remote control device is normal, the flight controller 202 may control the flight of the UAV 201 based on the first control signal received from the main remote control device.

The flight controller 202 may determine whether a request for switching the control is received from the backup remote control device (step 410). For example, when a trainer noticed that the trainee has conducted inadequate operations that may expose the UAV to safety related risk, the trainer may request to switch the control. When the flight controller 202 determines that the request for switching the control is received from the backup remote control device (Yes, step 410), the flight controller 202 may switch the control of the UAV 201 to the backup remote control device, and may control the flight of the UAV 201 based on control signals received from the backup remote control device (step 415).

In some embodiments, the flight controller 202 may determine whether the backup remote control device currently controlling the UAV 201 requested to release the control (step 420). For example, when the trainer determines that the trainee can operate the UAV correctly, the trainer may request to release the control of the UAV. If the backup remote control device has not requested to release the control (No, step 420), the flight controller 202 may maintain the control of the UAV 201 using the backup remote control device that is currently controlling the UAV 201. That is, the flight controller 202 may control the UAV 201 using the backup remote control device in a normal fly operation (step 415). When the flight controller 202 determines that the backup remote control device currently controlling the UAV 201 has requested to release the control of the UAV 201 (Yes, step 420), the flight controller 202 may determine or check whether the connection with the main remote control device is abnormal (step 425). If the connection is normal (No, step 425), the flight controller 202 may switch the control of the UAV 201 to the main remote control device, and control the flight of the UAV 201 based on control signals received from the main remote control device in a normal fly operation (step 405). If the connection is abnormal (Yes, step 425), the flight controller 202 may disallow the backup remote control device to release the control. That is, the flight controller 202 may continue to control the UAV 201 based on control signals received from the backup remote control device in a normal fly operation (step 415).

Figure 5:
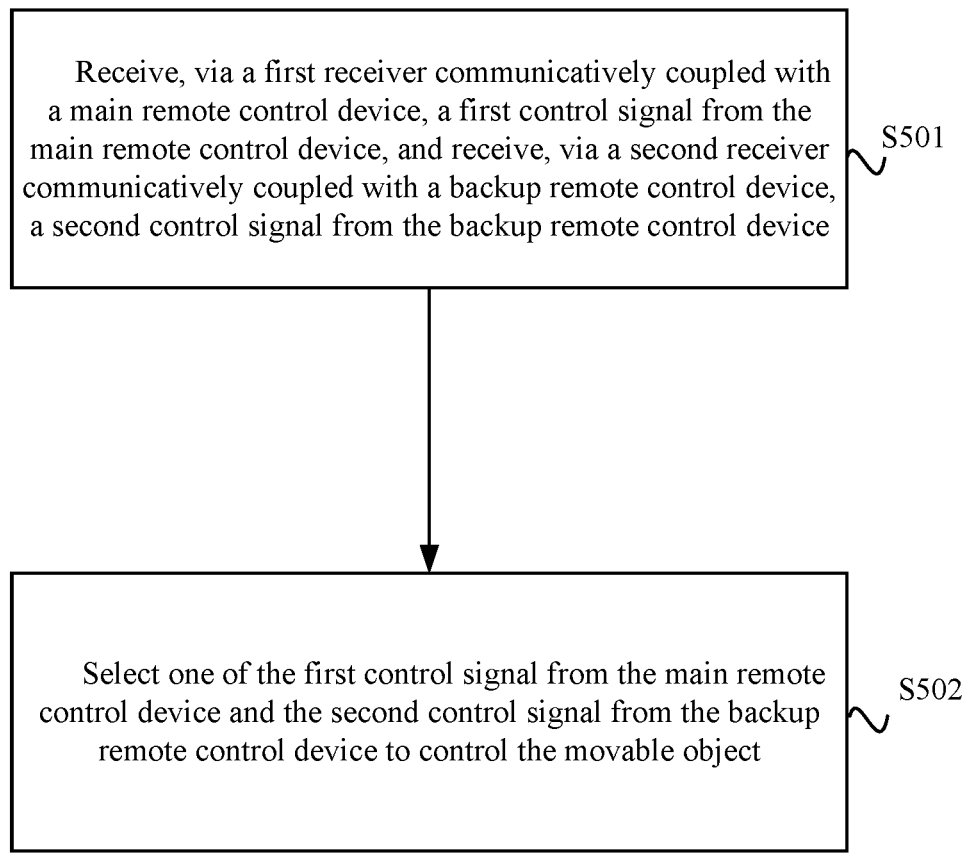
FIG. 5 is a flow chart illustrating a method for redundancy control according to another example embodiment.

FIG. 5 is a flow chart illustrating a method 500 for redundancy control according to another example embodiment. The method 500 may be performed by any processor or controller disclosed herein, such as a redundancy control device (e.g., the flight controller 202).

In step S501, the flight controller 202 may receive, via a first receiver, communicatively coupled with a main (or first) remote control device, a first control signal from the main remote control device. In addition, the flight controller 202 may receive, via a second receiver communicatively coupled with a backup (or second) remote control device, a second control signal from the backup remote control device.

In step S502, the flight controller 202 may select one of the first control signal from the main remote control device and the second control signal from the backup remote control device to control the movable object.

In some embodiments, the movable object 201 may include at least one of an unmanned aerial vehicle ("UAV"), an unmanned boat or ship, an unmanned ground vehicle (e.g., cars, trucks), or a robot. In the present disclosure, the UAV is used as an example of the movable object 201 for illustration purposes.

Descriptions of the connection between the remote control device and the corresponding receiver, and descriptions of the connection between the receiver and the flight control device can refer to the above descriptions.

In some embodiments, when the connection with the main remote control device is normal, the control signal from the main remote control device may be selected for controlling the UAV.

In some embodiments, there may be one or multiple backup remote control devices.

In some embodiments, there is only one backup remote control device. When the connection with the main remote control device is abnormal, and the connection with the only one backup remote control device is normal, the flight controller 202 may select the control signal from the backup remote control device for controlling the UAV. When the flight controller 202 determines that the connection with the only one backup remote control device is abnormal, the flight controller 202 may activate an out-of-control mode (such that the UAV may enter the out-of-control mode). The abnormal connection with the remote control device and the out-of-control mode have been described above.

In some embodiments, there is only one backup remote control device. When the connection with the main remote control device is abnormal, the flight controller 202 may determine or check whether the connection with the only one backup remote control device is normal. When the flight controller 202 determines that the connection with the only one backup remote control device is normal, the flight controller 202 may select the control signal from the backup remote control device for controlling the UAV. When the flight controller 202 determines that the connection with the only one backup remote control device is abnormal, the flight controller 202 may activate an out-of-control mode. The abnormal connection with the remote control device and the out-of-control mode have been described above.

In some embodiments, there are multiple backup remote control devices. When the connection with the main remote control device is abnormal, the flight controller 202 may select a control signal from one of the backup remote control devices with which connections are normal for controlling the movable object based on a predetermined rule. In some embodiments, the predetermined rule may include at least one of: selection based on an order from a high priority to a low priority, selection based on an identification number of the remote control device, or random selection. When connections with all of the backup remote control devices are abnormal, the UAV may enter the out-of-control mode.

In some embodiments, there are multiple backup remote control devices. When the connection with the main remote control device is abnormal, based on the predetermined rule, the flight controller 202 may check whether the connection with the backup remote control device is normal. If there is a backup remote control device with which the connection is normal, the flight controller 202 may select the control signal from the backup remote control device with which the connection is normal to control the UAV, and may stop checking. In some embodiments, the predetermined rule may include at least one of: selection based on an order from a high priority to a low priority, selection based on an identification number of the remote control device, or random selection. When connections with all of the backup remote control devices are abnormal, the UAV may enter the out-of-control mode.

In some embodiments, while the UAV is controlled based on a control signal from a backup remote control device, when the connection with the main remote control device is restored, if automatically switching the control of the UAV to the main remote control device is allowed, the flight controller 202 may switch to the main remote control device, and control the UAV based on control signals received from the main remote control device. If automatically switching the control of the UAV to the main remote control device is not allowed, the flight controller 202 may continue to control the UAV based on control signals received from the backup remote control device currently controlling the UAV. When the flight controller 202 receives a message from the main remote control device requesting to switch the control of the UAV, the flight controller 202 may switch the control of the UAV from the backup remote control device to the main remote control device, and control the UAV based on control signals received from the main remote control device.

In some embodiments, while the UAV is controlled based on a control signal from a backup remote control device, when the connection with the main remote control device is restored, the flight controller 202 may determine whether automatically switching the control of the UAV to the main remote control device is allowed. Based on a determination that automatically switching the control of the UAV to the main remote control device is allowed, the flight controller 202 may switch to the main remote control device, and control the UAV based on control signals received from the main remote control device. Based on a determination that automatically switching the control of the UAV to the main remote control device is not allowed, the flight controller 202 may continue to control the UAV based on control signals received from the backup remote control device currently controlling the UAV. When the flight controller 202 receives a message from the main remote control device requesting to switch the control of the UAV, the flight controller 202 may switch the control of the UAV from the backup remote control device to the main remote control device, and control the UAV based on control signals received from the main remote control device.

In some embodiments, while the UAV is controlled based on the control signal from the backup remote control device, when the currently controlling backup remote control device requests to release the control, if the connection with the main remote control device is normal, the flight controller 202 may select the control signal from the main remote control device to control the UAV. If the connection with the main remote control device is abnormal, the flight controller 202 may not allow the currently controlling backup remote control device to release the control of the UAV. In some embodiments, while the UAV is controlled based on the control signal from the backup remote control device, when the currently controlling backup remote control device requests to release the control, the flight controller 202 may check whether the connection with the main remote control device is normal. If the connection with the main remote control device is normal, the flight controller 202 may select the control signal from the main remote control device to control the UAV. If the connection with the main remote control device is abnormal, the flight controller 202 may not allow the currently controlling backup remote control device to release the control of the UAV.

In embodiments of the present disclosure, by using multiple control signal input sources (e.g., multiple pairs of remote control device and receiver), the present disclosure provides a redundancy backup. Based on a determination that a control signal input source is lost, the flight controller 202 may switch to another control signal input source, thereby reducing the likelihood of losing control of the UAV and having a flight safety related accident.

In some embodiments, the main remote control device is a trainee or student remote control device, and the backup remote control device is a trainer or coach remote control device. When the trainee remote control device sends an inadequate command to the UAV, which may expose the UAV to safety related risk, the trainer remote control device may request to take over the control of the UAV. After receiving the request to take over the control of the UAV from the trainer remote control device, the flight controller may select a control signal from the trainer remote control device to control the UAV.

In some embodiments, when the currently controlling backup remote control device requests to release the control of the UAV, if the connection with the main remote control device is normal, the flight controller 202 may select a control signal from the main remote control device to control a movable object. If the connection with the main remote control device is abnormal, the flight controller 202 may not allow the backup remote control device to release the control of the UAV.

In some embodiments, after receiving a request from the backup remote control device currently controlling the UAV to release the control, the flight controller 202 may check whether the connection with the main remote control device is normal. If the connection with the main remote control device is normal, the flight controller 202 may select a control signal from the main remote control device to control the UAV. If the connection with the main remote control device is abnormal, the flight controller 202 may not allow the backup remote control device to release the control of the UAV.

In some embodiments of the present disclosure, automatically switching between multiple control signal input sources is adopted. When the trainee remote control device transmits an inadequate control signal that may expose the UAV to safety related risk, the trainer remote control device may proactively take over the control of the UAV, thereby effectively reducing the likelihood of encountering danger by the UAV when a user learns to how fly the UAV.

Figure 6A:
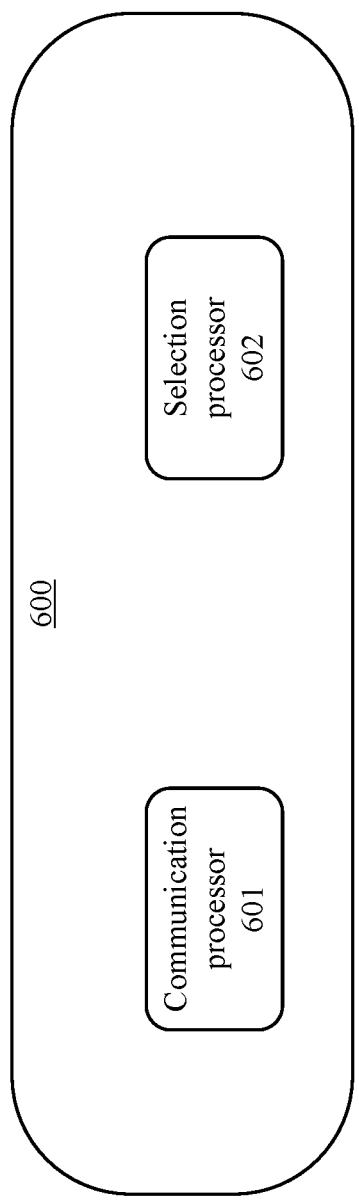
FIG. 6A is a schematic diagram of a device for redundancy control according to an example embodiment.

FIG. 6A is a schematic diagram of a device 600 for redundancy control (or a redundancy control device) according to an example embodiment of the present disclosure. The device 600 may be an embodiment of or may be included in the flight controller 202. The device 600 may include a communication processor 601 and a selection processor 602.

The communication processor 601 may receive a first control signal from the main remote control device through a first receiver corresponding to the main remote control device and a second control signal from the backup remote control device through a second receiver corresponding to the backup remote control device.

The selection processor 602 may select one of the first control signal from the main remote control device and the second control signal from the backup remote control device for controlling the movable object.

In some embodiments, the movable object may include at least one of an unmanned aerial vehicle ("UAV"), an unmanned boat or ship, an unmanned vehicle (e.g., cars, trucks), or a robot. The present disclosure uses the UAV as an example of the movable object.

The connection between the remote control device and the corresponding receiver, and the connection between the receiver and the flight controller have been described above.

In some embodiments, when the connection with the main remote control device is normal, the selection processor 602 may select the control signal from the main remote control device to control the UAV.

In some embodiments, there may be one or multiple backup remote control devices.

When there is only one backup remote control device, and when the connection with the main remote control device is abnormal, if the connection with the backup remote control device is normal, the selection processor 602 may select the control signal from the backup remote control device for controlling the UAV. If the connection with the backup remote control device is abnormal, the UAV may enter the out-of-control mode. In some embodiments, descriptions of the abnormal connection with a remote control device can refer to the previous descriptions. The out-of-control mode has also been described above.

Figure 6B:
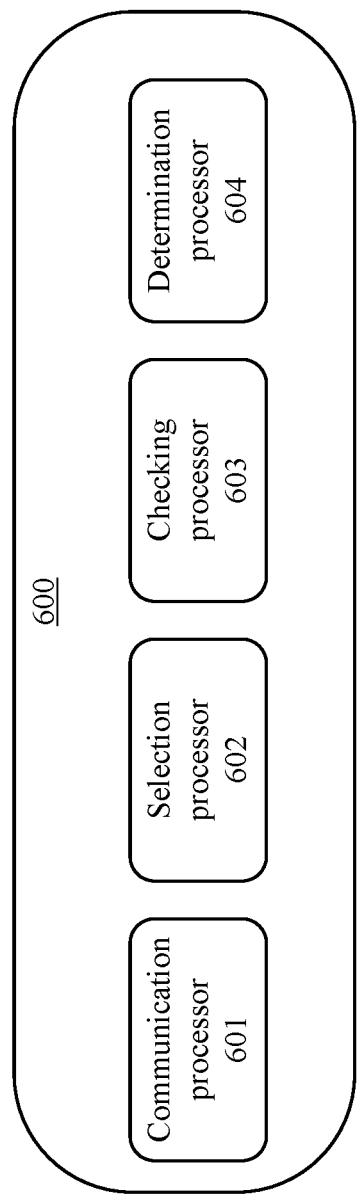
FIG. 6B is a schematic diagram of a device for redundancy control according to another example embodiment.

In some embodiments, there is one backup remote control device. As shown in FIG. 6B, the redundancy control device 600 may include a checking processor 603. When the connection with the main remote control device is abnormal, the checking processor 603 may be configured to check whether the connection with the backup remote control device is normal. If the connection with the backup remote control device is normal, the selection processor 602 may select the control signal from the backup remote control device for controlling the UAV. If the connection with the backup remote control device is abnormal, the UAV may enter the out-of-control mode.

In some embodiments, there are multiple backup remote control devices. When the connection with the main remote control device is abnormal, the selection processor 602 may select, based on a predetermined rule, control signals of a backup remote control device from a plurality of remote control devices with which connections are normal, to control the UAV. In some embodiments, the predetermined rule may include at least one of: selection based on an order from a high priority to a low priority, selection based on an identification number of the remote control device, or random selection. When connections with all of the backup remote control devices are abnormal, the UAV may enter the out-of-control mode.

In some embodiments, there are multiple backup remote control devices. When connection with the main remote control device is abnormal, the checking processor 603 may check, based on a predetermined rule, whether the connections with the multiple backup remote control devices are normal. Based on a determination that a connection with a backup remote control device is normal, the selection processor 602 may select control signals from the backup remote control device with which connection is normal for controlling the UAV, and may stop checking. In some embodiments, the predetermined rule may include at least one of: selection based on an order from a high priority to a low priority, selection based on an identification number of the remote control device, or random selection. When connections with all of the backup remote control devices are abnormal, the UAV may enter the out-of-control mode.

In some embodiments, while the UAV is controlled based on control signals from the backup remote control device, when the connection with the main remote control device is restored, if automatic switching to the main remote control device is allowed, the selection processor 602 may select the control signals from the main remote control device to control the UAV.

In some embodiments, as shown in FIG. 6B, the redundancy control device 600 may also include a determination processor 604 configured to determine, when the connection with the main remote control device is restored, whether automatically switching to the main remote control device is allowed. If automatically switching to the main remote control device is allowed, the selection processor 602 may select control signals from the main remote control device to control the UAV. If automatically switching to the main remote control device is not allowed, the selection processor 602 may maintain the selection of the control signals from the backup remote control device to control the UAV. After the communication processor 601 receives a message from the main remote control device requesting to switch the control of the UAV, the selection processor 602 may select the control signals from the main remote control device to control the UAV. In some embodiments, when the currently controlling backup remote control device requests to release the control of the UAV, and if the connection with the main remote control device is normal, the selection processor 602 may select the control signals from the backup remote control device to control the UAV. If the connection with the main remote control device is abnormal, the selection processor 602 may not allow the currently controlling backup remote control device to release the control.

In some embodiments, when the currently controlling backup remote control device requests to release the control of the UAV, the checking processor 603 may check whether the connection with the main remote control device is normal. If the connection with the main remote control device is normal, the selection processor 602 may select the control signals from the main remote control device to control the UAV. If the connection with the main remote control device is abnormal, the selection processor 602 may not allow the currently controlling backup remote control device to release the control.

In some embodiments, by using multiple control signal input sources (e.g., multiple pairs of remote control device and receiver), the present disclosure provides a redundancy backup. Based on a determination that a control signal input source is lost, the flight controller 202 may switch to another control signal input source, thereby reducing the likelihood of losing control of the UAV and having a flight safety related accident.

In some embodiments, the main remote control device is a trainee or student remote control device, and the backup remote control device is a trainer or coach remote control device. When the trainee remote control device sends an inadequate control command, which may expose the UAV to safety related risk, the trainer remote control device may send a message requesting to take over the control of the UAV. In some embodiments, when the communication processor 601 receives the message requesting to take over the control from the trainer remote control device, the selection processor 602 may select the control signals from the trainer remote control device to control the UAV.

In some embodiments, when the communication processor 601 receives a message requesting to release the control from the currently controlling trainer remote control device, and if the connection with the trainee remote control device is normal, the selection processor 602 may select the control signals from the trainee remote control device to control the UAV. If the connection with the trainee remote control device is abnormal, the selection processor 602 may not allow the currently controlling trainer remote control device to release the control.

In some embodiments, after the communication processor 601 receives the message requesting to release the control from the trainer remote control device, the checking processor 603 may check whether the connection with the trainee remote control device is normal. If the connection with the trainee remote control device is normal, the selection processor 602 may select the control signals from the trainee remote control device to control the UAV. If the connection with the trainee remote control device is abnormal, the selection processor 602 may not allow the currently controlling trainer remote control device to release the control.

In some embodiments, automatically switching between multiple control signal input sources is adopted. When the trainee remote control device transmits an inadequate control signal that may expose the UAV to safety related risk, the trainer remote control device may proactively take over the control of the UAV, thereby effectively reducing the likelihood of encountering danger by an UAV when a user learns to how fly the UAV.

Figure 7:
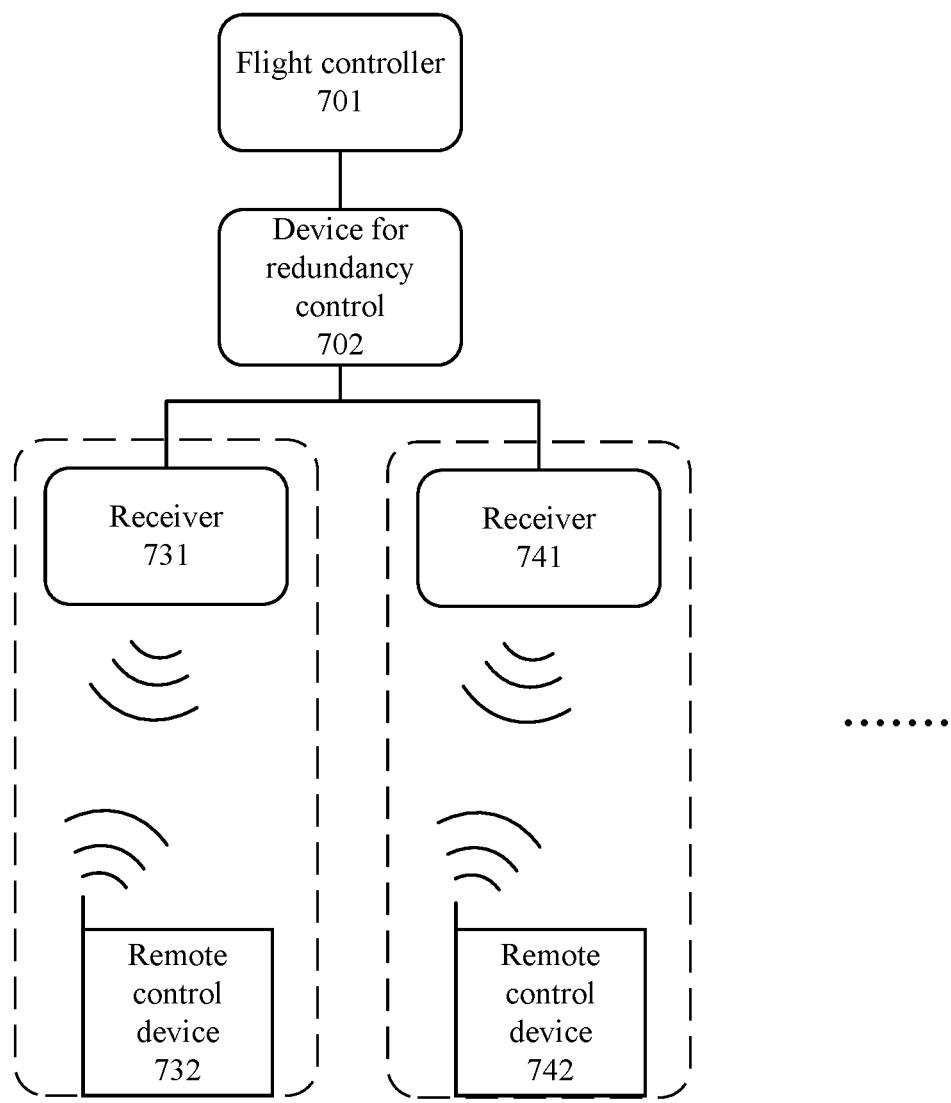
FIG. 7 is a schematic diagram of a system for redundancy control according to an example embodiment.

In some embodiments, as shown in FIG. 7, a device 702 for redundancy control is independent of a flight controller 701. In some embodiments, the device 702 for redundancy control may be disposed separately from a processor of the flight controller 702.

Figure 8:
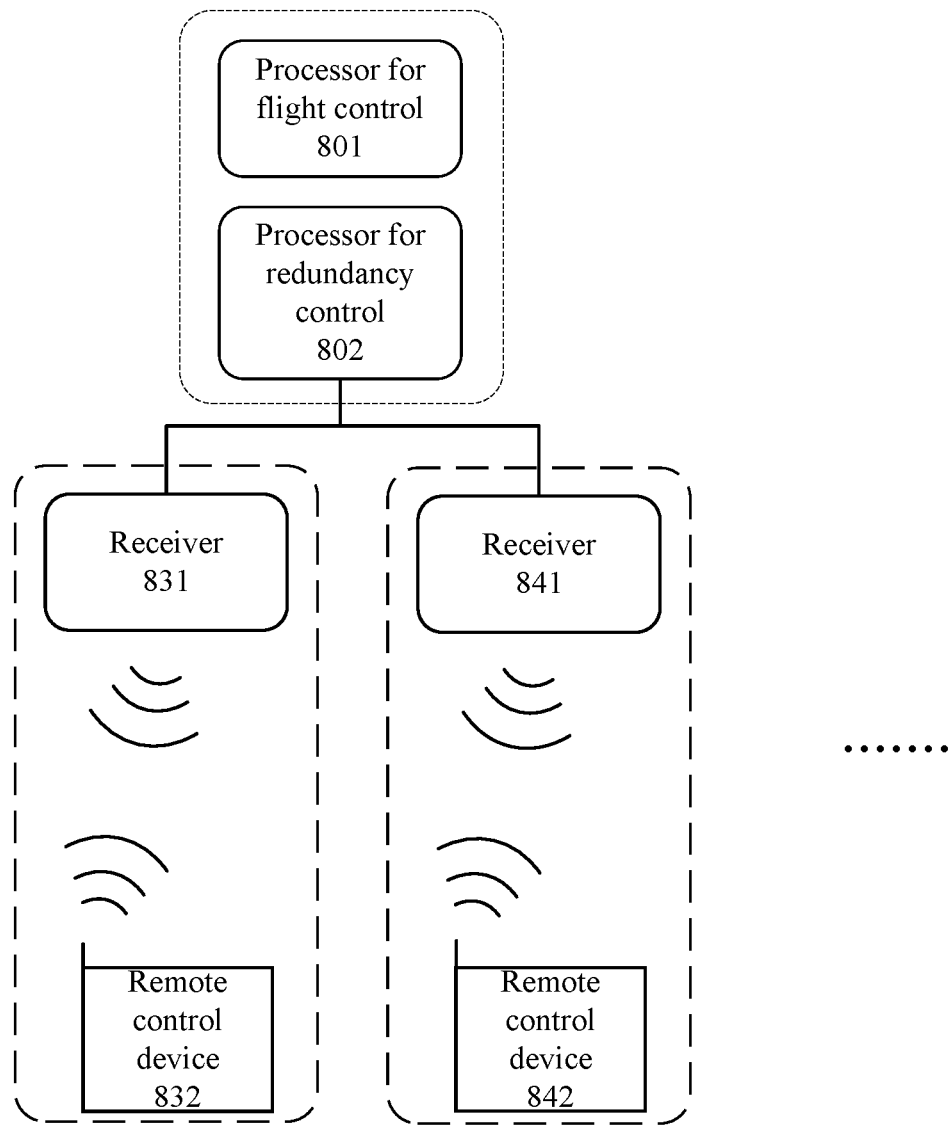
FIG. 8 is a schematic diagram of a system for redundancy control according to another example embodiment.

In some embodiments, as shown in FIG. 8, a processor 802 for redundancy control may be disposed inside or included as a part of a microprocessor of a flight controller along with a processor 801 for flight control.

In some embodiments, the present disclosure provides a system for redundancy control, including a storage device, such as a memory or other types of computer-readable media, which may be configured to store computer-executable codes or instructions. The system may also include on or more processors configured or programmed to retrieve and execute the computer-executable codes or instructions to perform the redundancy control methods disclosed herein.

In some embodiments, the present disclosure also provides a storage medium, such as a non-transitory computer-readable storage medium, configured to store codes or instructions that are executable by a processor to perform the redundancy control methods disclosed herein.

In some embodiments, the present disclosure provides an unmanned aerial vehicle system including one or more propulsion assemblies, a flight controller, a main remote control device, at least one backup remote control device, and a device for redundancy control.

When describing the various embodiments, the descriptions follow a progressive approach. The description of an embodiment may be based on the difference between the embodiment and previously described embodiments. Therefore, similar features and parts included in the embodiment may have already been described in one or more previously described embodiments. For a device that implements the disclosed methods, because the descriptions of the functions of the device are similar to the descriptions of the corresponding methods, the descriptions of the functions are simplified or omitted. Thus, for descriptions of the functions of the device, one can refer to the descriptions of the corresponding methods.

A person having ordinary skill in the art can appreciate that part or all of the above disclosed methods and processes may be implemented using related electrical hardware, computer software, or a combination of electrical hardware and computer software that may control the electrical hardware. In order to explain the changeability of the hardware and software, the above descriptions have generally described the components and steps of each embodiment based on the related functions. Whether the implementation is through hardware or software is to be determined based on specific application and design constraints. A person of ordinary skill in the art may use different methods for different applications. Such implementations fall within the scope of the present disclosure.

The disclosed functions, methods, and algorithms may be realized using hardware, software functioning units executable by processors, or a combination thereof. The software functioning units may be stored in a computer-readable medium as instructions or codes, such as a non-transitory computer-readable storage medium. In some embodiments, the software functioning units may be stored in a random access memory ("RAM"), a read-only memory ("ROM"), an Electrically Programmable read only memory ("EPROM"), an Electrically Erasable Programmable read only memory ("EEPROM"), a register, a hard disk, a movable magnetic disc, a Compact Disc-ROM, or any other types of storage media.

The connection verification method, device, unmanned aerial vehicle system, and storage medium are described above. Examples are used to explain the principles and operations of the various embodiments. The descriptions of the embodiments are only for the purpose of explaining the methods and systems of the present disclosure. A person having ordinary skill in the art can modify or improve the various features of the present disclosure without departing from the principle of the various embodiments disclosed herein. Such modification or improvement also fall within the scope of the present disclosure.

Other embodiments of the present disclosure will be apparent to those skilled in the art from consideration of the specification and practice of the embodiments disclosed herein. It is intended that the specification and examples be considered as example only and not to limit the scope of the present disclosure, with a true scope and spirit of the invention being indicated by the following claims. Variations or equivalents derived from the disclosed embodiments also fall within the scope of the present disclosure.

What is claimed is:

1. A method comprising:
    establishing a first wireless connection between a movable object and a first remote control device remotely coupled to the movable object;
    establishing a second wireless connection between the movable object and at least one second remote control device remotely coupled to the movable object;
    selecting, based on a determination that the first wireless connection is normal, a first control signal received from the first remote control device to control the movable object; and
    selecting, based on a determination that the first wireless connection is abnormal and that the second wireless connection is normal, a second control signal received from the at least one second remote control device to control the movable object.

2. The method of claim 1, wherein the first wireless connection and the second wireless connection use different radio frequencies.

3. The method of claim 1, further comprising:
    based on a determination that the first wireless connection is abnormal and that the second wireless connection is abnormal, activating an out-of-control mode for the movable object.

4. The method of claim 3, wherein the out-of-control mode includes at least one of an out-of-control return, suspension, or descending at a predetermined speed.

5. The method of claim 1, wherein:
the at least one second remote control device includes a plurality of second remote control devices; and
establishing the second wireless connection between the movable object and the at least one second remote control device includes establishing a plurality of second wireless connections between the movable object and the plurality of second remote control devices, respectively.

6. The method of claim 5, further comprising:
based on a determination that the first wireless connection is abnormal and that at least one of the plurality of second wireless connections is normal, selecting, based on a predetermined rule, the second control signal received through the at least one of the plurality of second wireless connections for controlling the movable object.

7. The method of claim 6, wherein the predetermined rule includes at least one of: selection based on an order from a highest priority to a lowest priority, selection based on an identification number, or random selection.

8. The method of claim 5, further comprising:
based on a determination that the first wireless connection is abnormal and that all of the plurality of second wireless connections are abnormal, activating an out-of-control mode for the movable object.

9. The method of claim 1, further comprising:
based on a determination that the first wireless connection has been restored and that automatic switching to the first remote control device is allowed, selecting the first control signal to control the movable object.

10. The method of claim 1, further comprising:
maintaining, based on a determination that first wireless connection has been restored and that automatic switching to the first remote control device is not allowed, control of the movable object based on the second control signal; and
selecting, in response to receiving a message requesting to switch control from the first remote control device, the first control signal to control the movable object.

11. The method of claim 1, further comprising:
based on a determination that the first wireless connection is normal in response to receiving a message requesting to release control from the at least one second remote control device, selecting the first control signal to control the movable object; or
based on a determination that the first wireless connection is abnormal, disallowing the at least one second remote control device to release the control.

12. The method of claim 1, wherein:
establishing the first wireless connection includes establishing the first wireless connection between a first receiver of the movable object and the first remote control device; and
establishing the second wireless connection includes establishing the second wireless connection between a second receiver of the movable object and the at least one second remote control device.

13. The method of claim 12, further comprising:
determining the first wireless connection is abnormal in response to:
the first wireless connection being lost; or
connection information received by a flight controller from the first receiver indicating that the first wireless connection is abnormal; and
determining the second wireless connection is abnormal in response to:
the second wireless connection being lost; or
connection information received by the flight controller from the second receiver indicating that the second wireless connection is abnormal.

14. The method of claim 12, further comprising:
determining the first wireless connection is abnormal in response to:
the first remote control device malfunctioning; or
connection information received by a flight controller from the first receiver indicating that the first wireless connection is abnormal; and
determining the second wireless connection is abnormal in response to:
the at least one second remote control device malfunctioning; or
connection information received by the flight controller from the second receiver indicating that the second wireless connection is abnormal.

15. The method of claim 12, further comprising:
determining the first wireless connection is abnormal in response to:
a flight controller losing a physical connection with the first receiver; or
the flight controller determining that the first wireless connection is abnormal; and
determining the second wireless connection is abnormal in response to:
the flight controller losing a physical connection with the second receiver; or
the flight controller determining that the second wireless connection is abnormal.

16. The method of claim 1, further comprising:
selecting the second control signal to control the movable object in response to receiving, from the at least one second remote control device, a message requesting to take over control of the movable device.

17. The method of claim 16, further comprising:
in response to the at least one second remote control device requesting to release control of the movable object:
selecting the first control signal to control the movable object in response to the first wireless connection being normal; or
disallowing the at least one second remote control device to release the control in response to the first wireless connection being abnormal.

18. The method of claim 1, wherein the movable object includes at least one of an unmanned aerial vehicle, an unmanned boat, an unmanned ground vehicle, or a robot.

19. A device comprising:
a memory configured to store instructions; and
a processor configured to execute the instructions to:
establish a first wireless connection between a movable object and a first remote control device remotely coupled to the movable object;
establish a second wireless connection between the movable object and at least one second remote control device remotely coupled to the movable object;
select, based on a determination that the first wireless connection is normal, a first control signal received from the first remote control device to control the movable object; and
select, based on a determination that the first wireless connection is abnormal and that the second wireless connection is normal, a second control signal received from the at least one second remote control device to control the movable object.

20. The device of claim 19, wherein the first wireless connection and the second wireless connection use different radio frequencies.

\* \* \* \* \*